United States Patent [19]

Mizuno

[11] 4,236,143

[45] Nov. 25, 1980

[54] APPARATUS FOR CONTROLLING VEHICLE DIRECTIONAL LAMPS

[75] Inventor: Tiaki Mizuno, Toyota, Japan

[73] Assignee: Nippondenso Co., Ltd., Kariya, Japan

[21] Appl. No.: 961,366

[22] Filed: Nov. 16, 1978

[30] Foreign Application Priority Data

Dec. 1, 1977 [JP] Japan .................. 52-144691

[51] Int. Cl.³ ............................................. B60Q 1/34
[52] U.S. Cl. ...................................... 340/73; 340/641; 340/81 F
[58] Field of Search ................... 340/81 R, 81 F, 73, 340/641

[56] References Cited

U.S. PATENT DOCUMENTS

| | | | |
|---|---|---|---|
| 3,858,177 | 12/1974 | Kugelmann et al. | 340/73 |
| 4,150,359 | 4/1979 | Mizuno et al. | 340/81 R |

Primary Examiner—Donald J. Yusko
Attorney, Agent, or Firm—Cushman, Darby & Cushman

[57] ABSTRACT

An improved apparatus for use in the turn-direction indicating system of a vehicle having at least front and rear directional lamps. The directional lamps are connected in parallel with each other to be energized by a battery through a current detecting resistor, a relay and a direction selecting switch. The relay is energized to close periodically in response to periodic pulse so that the directional lamps flash periodically. Generation of the periodic pulses is controlled in response to the voltages appeared across the current detecting resistor and at the junction between the relay and the direction indicating switch. The relay is adapted to function as an alarm buzzer for informing the disconnection of both front and rear directional lamps.

5 Claims, 5 Drawing Figures

APPARATUS FOR CONTROLLING VEHICLE DIRECTIONAL LAMPS

BACKGROUND OF THE INVENTION

The present invention relates to an apparatus for controlling periodic flashings of vehicle directional lamps and particularly to an improvement in the generation of pulses which control the periodic flashings of the directional lamps.

It is known well in the turn-direction indicating system of an automotive vehicle that a group of front, rear and side directional lamps are energized in response to periodic pulses to flash periodically upon requirement for the indication of vehicle turning direction. It is also known that the frequency of the periodic pulses is increased upon disconnection of the front or rear directional lamp to increase flashing frequency of the remaining directional lamps.

One of this system is disclosed in the prior art, U.S. Pat. No. 3,858,177 issued on Dec. 31, 1974, in which front and rear directional lamps are connected in parallel with each other and connected in series with a battery, a current detecting resistor, a relay and a turn-direction selecting switch and an electronic circuit including a flip-flop is provided to generate periodic pulses applied to the relay. The electronic circuit is connected to the turn-direction selecting switch so that, when the flip-flop is rendered operative in response to the closure of the selecting switch, the periodic pulses are generated.

According to this kind of electric connection between the electronic circuit and the turn-direction selecting switch, the electronic circuit is likely to generate the periodic pulses erroneously when the flip-flop is accidentally rendered operative or inoperative in response to electric noise signals which are induced on long electric wirings extending from the battery to the directional lamps. To obviate this erroneous operation, it is suggested to provide a capacitor at such a portion as the input side of the flip-flop (specification, column 9, lines 22–38). However, due to the difficulty in integrating the capacitor into an integrated semiconductor chip, the capacitor inevitably must be provided outside the semiconductor chip. This results in an increase in manufacturing cost.

SUMMARY OF THE INVENTION

It is therefore a primary object of the present invention to provide an apparatus which is not only free from erroneous operation but also more suited for integration. For this object, a logic circuit responsive to the voltages appeared across a current detecting resistor and at the junction between a normally-open relay and a turn-direction selecting switch is provided to allow a pulse generator to generate periodic pulses during closure of the turn-direction selecting switch.

It is a further object of the present invention to provide an apparatus in which a relay energized by the periodic pulses functions as a buzzer to inform the disconnections of both front and rear directional lamps. For this object, a comparator responsive to the voltage appeared across the current detecting resistor is provided to detect the disconnections of both front and rear directional lamps.

It is a still further object of the present invention to provide an apparatus in which the flashing frequency of the directional lamps is increased to inform of the disconnection of either front or rear directional lamp. For this object, another comparator responsive to the voltage appeared across the current detecting resistor is provided to increase the frequency of the periodic pulses generated by the pulse generator.

DETAILED DESCRIPTION OF THE PREFERRED EMBODIMENTS

Figure 1:
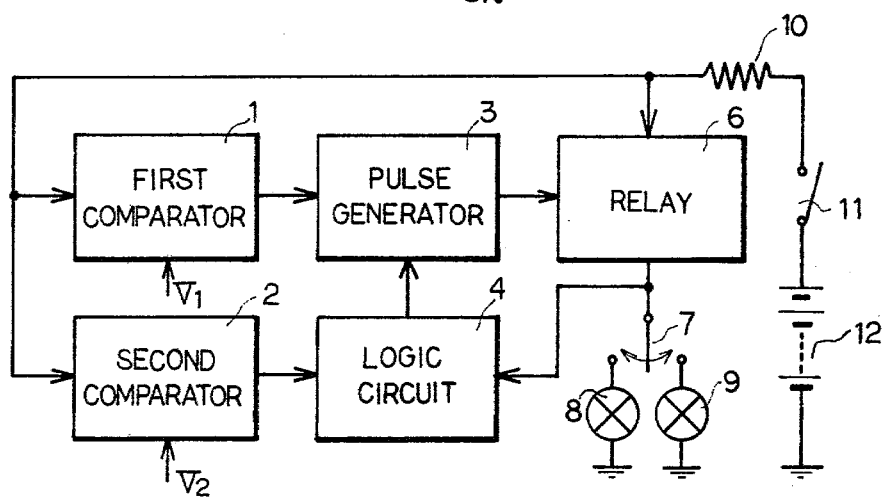
FIG. 1 is a schematic block diagram illustrating an apparatus for controlling vehicle directional lamps according to the present invention.

Referring first to FIG. 1, two directional lamp groups 8 and 9 are shown in series connection with a manually-operated turn-direction selecting switch 7, a relay 6, a current detecting resistor 10 having low resistance, a battery switch 11 and a storage battery 12. The directional lamp groups 8 and 9 are mounted on respective left and right portions of an automotive vehicle, for example. As is known well, either one of directional lamp groups 8 and 9 is energized upon closure of the selecting switch 7 by the battery 12 through the battery switch 11, the resistor 10 and the relay 6. The relay 6 is energized periodically during the closure of the selection switch 7 to cause the lamp group 8 or 9 to flash periodically for indicating the turning direction of the vehicle.

Provided to control the energization of the relay 6 is an electronic circuit comprising a first comparator 1, a second comparator 2, a pulse generator 3 and a logic circuit 4. The first and second comparators 1 and 2 are connected to the resistor 10 for respectively detecting lamp failure (disconnection in the lamp group) and closure of the selecting switch in response to the signal developed by the resistor 10. First and second reference signals $V_1$ and $V_2$ are applied to the first and second comparators 1 and 2, respectively, so that the signal applied from the resistor 10 is compared therewith. The logic circuit 4 is connected to the second comparator 2 and the junction between the relay 6 and the selecting switch 7 to detect the closure of the selecting switch 7. The pulse generator 3 is connected to the logic circuit 4 to generate periodic pulses in response to the logic output signal indicative of the closure of the selection switch 7. The pulse generator 3 is connected to the first comparator 1 to increase the frequency of the periodic pulses in response to the comparison output signal indicative of the disconnection in the lamp group. The pulse generator 3 is connected to the relay 6 which energizes the lamp group 8 or 9 in response to the periodic pulses.

Figure 3:
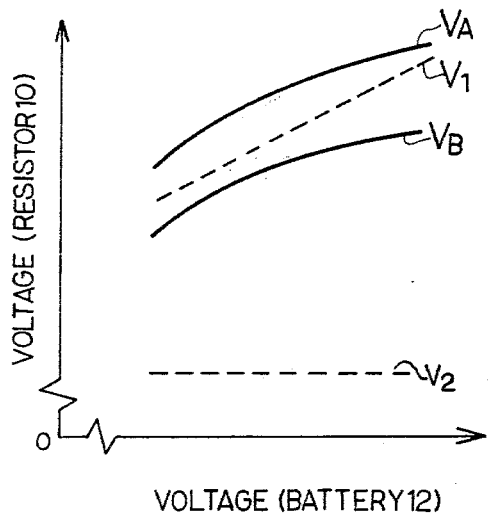
FIG. 3 is a characteristic chart illustrating relations between the voltages appeared across a battery and a current detecting resistor in the first embodiment.
Figure 2:
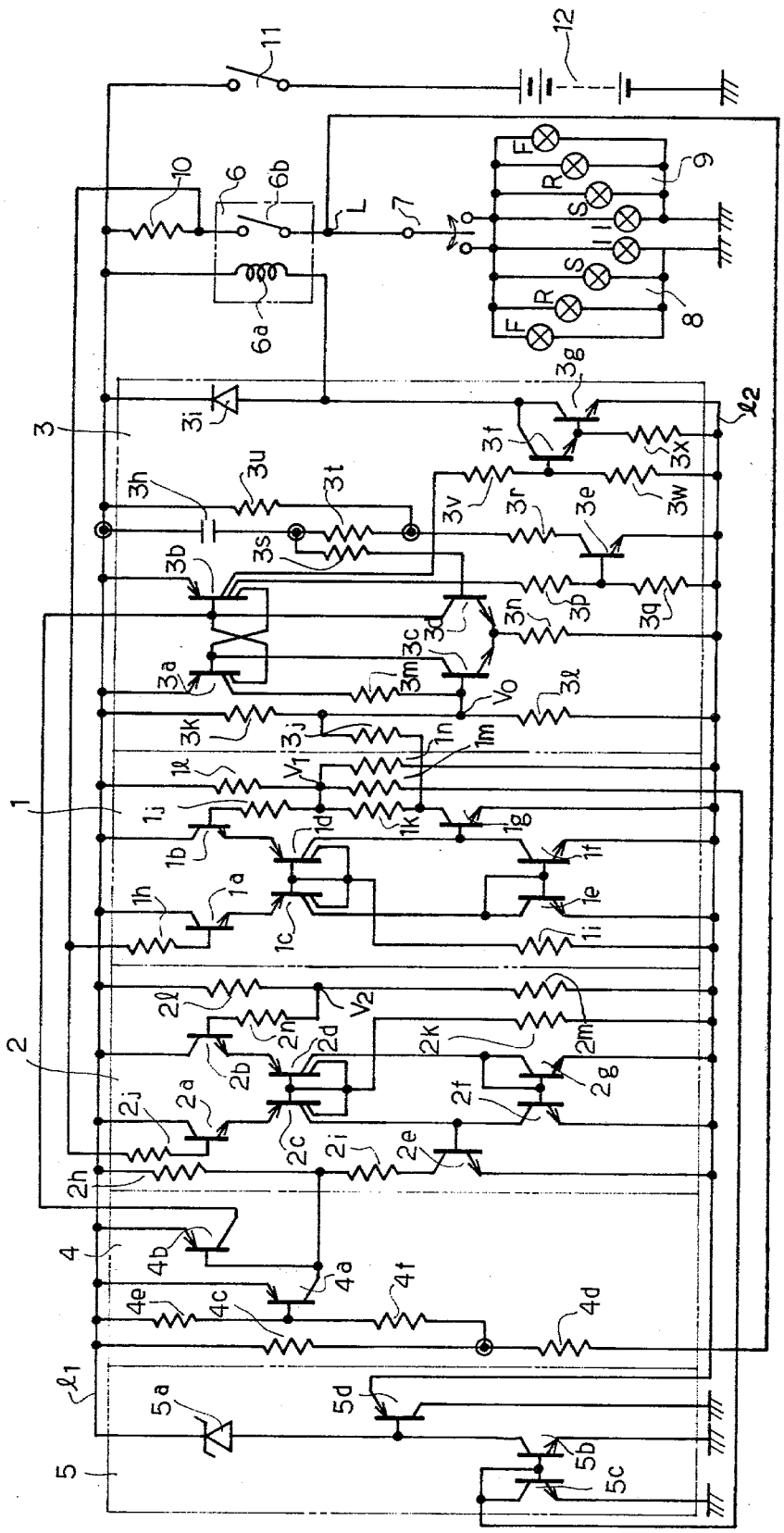
FIG. 2 is an electric wiring diagram illustrating a first embodiment.

Referring next to FIG. 2, it should be noticed that the relay 6 having a coil 6a and a switch 6b is normally-open type, or normally-nonconductive type, so that the resistor 10 and the selection switch 7 is normally disconnected. It should be noticed further that each of the lamp groups 8 and 9 comprises a front, rear, side and interior directional lamps which are connected in parallel with each other and denoted by respective alphabetical letters F, R, S and I. The directional lamps F, R and S are mounted on respective front, rear and side outside portions of the vehicle, whereas the directional lamp I is mounted on an inside portion of the vehicle. The front and rear lamps F and R (23 watts) consume more electric energy than the side lamp S (18 watts) which consumes more electric energy than the inner lamp I (3 watts). Since the voltage across the resistor 10 is proportional to the total current flowing from the battery 12 into the lamps F, R, S and I, the voltage across the resistor 10 becomes smaller when the lamp F or R is disconnected than when none of the lamps F, R, S and I are disconnected. The voltage across the resistor 10 is dependent on the voltage across the battery 12 as well as on lamp failures. Voltage changes across the resistor 10 are shown in FIG. 3 in relation to the voltage change across the battery 12. Characteristic curves $V_A$ and $V_B$ represent the voltages across the resistor 10 in respective cases of the absence of disconnection in the lamps and the presence of disconnection in the lamp F or R.

Referring further to FIG. 2, the electronic circuit designed to be integrated into a semiconductor chip is provided with a voltage regulator 5 which is connected across the battery 12 to supply the first and second comparators 1 and 2, the pulse generator 3 and the logic circuit 4 with a regulated constant voltage. The voltage regulator 5 comprises a zener diode 5a and transistors 5b, 5c and 5d. The zener diode 5a having a constant breakdown voltage is connected in series with the emitter-collector path of the transistor 5b between the ground and a positive bus $1_1$ connected to the positive terminal of the battery 12. The base, emitter and collector of the transistor 5d are connected to the zener diode 5a, a negative bus $1_2$ and the ground, respectively, so that the negative bus $1_2$ is kept at a potential proportional to the potential on the positive bus $1_1$. Therefore, the voltage between the positive and negative buses $1_1$ and $1_2$ is regulated substantially at the breakdown voltage of the zener diode 5a.

The first comparator 1 comprises transistors 1a, 1b, 1c, 1d, 1e, 1f and 1g, and resistors 1h, 1i, 1j, 1k, 1l, 1m and 1n. The emitter-collector paths of the transistors 1a, 1c and 1e are connected in series between the positive and negative buses $1_1$ and $1_2$, whereas the emitter-collector paths of the transistors 1b, 1d and 1f are connected in series between the positive and negative buses $1_1$ and $1_2$. The bases of the transistors 1c and 1d are connected to each other and the bases of the transistors 1e and 1f are connected to each other. The base of the output transistor 1g is connected to the collector of the transistor 1f. The base of the input transistor 1a is connected to the junction between the relay 6 and the current detecting resistor 10 through the resistor 1h to receive the voltage appeared across the resistor 10. The base of the input transistor 1b is connected to the junction among the resistors 1k, 1l, 1m and 1n through the resistor 1j to receive the first reference voltage $V_1$ appeared across the resistor 1l. As shown in FIG. 3, the first reference voltage $V_1$ which is proportional to the voltage across the battery 12 is determined to be smaller and larger than the respective voltages $V_A$ and $V_b$.

The second comparator 2 comprises transistors 2a, 2b, 2c, 2d, 2e, 2f and 2g, and resistors 2h, 2i, 2j, 2k, 2l, 2m and 2n. The emitter-collector paths of the transistors 2a, 2c and 2f are connected in series between the positive and negative buses $1_1$ and $1_2$, whereas the emitter-collector paths of the transistors 2b, 2d and 2g are connected in series between the positive and negative buses $1_1$ and $1_2$. The bases of the transistors 2c and 2d are connected to each other, and the bases of the transistors 2f amd 2g are connected to each other. The base of the output transistor 2e is connected to the collector of the transistor 2f. The base of the input transistor 2a is connected to the junction between the relay 6 and the current detecting resistor 10 through the resistor 2j to receive the voltage appeared across the resistor 10. The base of the input transistor 2b is connected to the junction between the resistors 2l and 2m through the resistor 2n to receive the second reference voltage $V_2$ appeared across the resistor 21. As shown in FIG. 3, the second reference voltage $V_2$ which is not responsive to the voltage across the battery 12 is determined to be much smaller and a little larger than the voltage $V_B$ and the zero voltage, respectively.

The pulse generator 3 comprises transistors 3a, 3b, 3c, 3d, 3e, 3f and 3g, a capacitor 3h, a diode 3i, and resistors 3j, 3k, 3l, 3m, 3n, 3p, 3q, 3r, 3s, 3t, 3u, 3v, 3w, and 3x. The base of the transistor 3c is connected to the junction between the resistors 3k and 3l to receive a reference voltage $V_0$ produced across the resistor 3k. The reference voltage $V_0$ is varied in response to the output voltage of the comparator 1 applied through the resistor 3j. The base of the transistor 3d is connected to the junction between the capacitor 3h and the resistor 3t through the resistor 3s to receive the voltage across the capacitor 3h which is adapted to charge and discharge during respective ON and OFF conditions of the transistor 3e. The base of the transistor 3e is connected through the resistor 3p to the collector of the transistor 3b to which the transistors 3f and 3g are connected. The bases of the transistors 3a and 3b connected to the respective transistors 3c and 3d are connected to the respective collectors of the transistors 3b and 3a. The base of the transistor 3b is connected to receive the output signal of the logic circuit 4.

The logic circuit 4 comprises transistors 4a and 4b, and resistors 4c, 4d, 4e and 4f. The base of the transistor 4a is connected to the positive bus $1_1$ through the resistor 4e and to the junction L between the relay 6 and the selecting switch 7 through the resistors 4d and 4f. The collector of the transistor 4a and the base of the transistor 4b are connected to receive the output signal of the second comparator 2. The collector of the output transistor 4b is connected to the pulse generator 3.

In the above described electronic circuits 1, 2, 3, 4 and 5 integrated into a semiconductor chip, the capacitor 3h and the resistors 3t and 4d are not integrated but connected outside the semiconductor chip from the stand point of difficulty in integration.

Next, operation of the first embodiment shown in FIG. 2 is described. When the turn-direction selecting switch 7 is open, electric current does not flow from the battery 12 to the directional lamp groups 8 and 9 through the current detecting resistor 10. With the zero voltage appeared across the resistor 10, the transistors 2a, 2c and 2e of the second comparator 2 are rendered ON, and the transistors 2b, 2d and 2f are rendered OFF. The transistor 4b of the logic circuit 4 is rendered ON in response to the low level voltage appeared across the resistor 2i of the comparator 2. In response to the ON condition of the transistor 4b of the logic circuit 4, the transistors 3b, 3d, 3e, 3f and 3g of the pulse generator 3 are rendered OFF, and the transistors 3a and 3c are rendered ON. The transistor 3e rendered OFF prevents the capacitor 3h from charging. The transistors 3f and 3g rendered OFF deenergize the coil 6a to keep the normally-open switch 6b open.

As soon as the selecting switch 7 is closed to contact with either lamp group 8 or 9 in which no lamp is disconnected, the junction L produces the low level voltage with the switch 6b still opening. In response to the low level voltage appeared across the lamp group 8 or 9, or at the junction L, the transistors 4a and 4b of the logic circuit 4 are rendered ON and OFF, respectively, to render the transistors 3b, 3d, 3e, 3f and 3g ON. The transistors 3f and 3g rendered ON energize the coil 6a to close the normally-open switch 6b. With the switch 6b being closed, the electric current flows from the battery 12 through the resistor 10 having the low resistance to allow the lamp group 8 or 9 to start flashing. When the electric current starts flowing through the lamp group 8 or 9, the voltage appeared at the terminal L increases to render the transistor 4a of the logic circuit 4 OFF which is liable to render the transistor 4b ON. However, since the resistor 10 produces the voltage $V_A$ much larger than the second reference voltage $V_2$, the transistors 2b, 2d and 2f of the second comparator 2 are rendered ON to render the transistor 2e OFF which keeps the OFF condition of the transistor 4b of the logic circuit 4. As a result, the transistors 3b, 3d, 3e, 3f and 3g rendered ON in response to the closure of the selecting switch 7 is prevented from being rendered OFF in response to the closure of the switch 6b. On this occasion, the transistors 1b, 1d and 1g of the first comparator 1 are rendered ON, and the transistors 1a, 1c and 1f are rendered OFF.

During ON conditions of the transistors 3b, 3d, 3e, 3f and 3g of the pulse generator 3, the capacitor 3h charges through the resistors 3t and 3r and the transistor 3e to produce thereacross a charged voltage which exponentially increases. When the charged voltage applied to the transistor 3d reaches the large reference voltage $V_{OL}$ determined by the resistors 3k, 3l and 3j in response to the low level output voltage produced across the transistor 1g of the first comparator 1, the transistors 3a and 3c are rendered ON to render the transistors 3b, 3d, 3e, 3f and 3g OFF. The coil 6a is responsively deenergized to open the switch 6b. As a result, the lamp group 8 or 9 through which the electric current does not flow stops flashing for a while. On this occasion the transistors 1a, 1c and 1f of the first comparator 1 are rendered ON, and the transistors 1b, 1d and 1g are rendered OFF. The transistors 2a, 2c and 2e of the second comparator 2 are rendered ON in response to the opening of the switch 6b. Although the transistor 4b of the logic circuit 4 is liable to be rendered ON responsively, the transistor 4a rendered ON prevents the transistor 4b from being rendered ON.

During OFF conditions of the transistors 3b, 3d, 3e, 3f and 3g of the pulse generator 3, the capacitor 3h discharges through the resistor 3u to produce thereacross a discharged voltage which exponentially decreases. When the discharged voltage applied to the transistor 3d reaches the small reference voltage $V_{OS}$ determined by the resistors 3j, 3k, 3l and 3m in response to the high level output voltage produced across the transistor 1g of the first comparator 1, the transistors 3b, 3d, 3e, 3f and 3g are rendered ON to render the transistors 3a and 3c OFF. The coil 6a is responsively energized to close the switch 6b. As a result, the lamp group 8 or 9 through which the electric current flows starts flashing again.

As long as the selecting switch 7 is kept closed, the abovedescribed operation is repeated to allow the pulse generator 3 to generate a train of pulses which control the flashing of the lamp group 8 or 9. Since the capacitor 3h charges and discharges alternately at respective time constants, the pulses generated from the pulse generator 3 are kept at a constant frequency to enable the periodic flashings of the lamp group 8 or 9.

The frequency and duty cycle of periodic flashings of the lamp group 8 or 9 are increased and decreased, respectively, in the following manner, when either the front or rear lamp F or R is disconnected. Upon disconnection of either the front or rear lamp F or R, the voltage $V_B$ appeared across the resistor 10 becomes smaller than the reference voltage $V_1$ of the first comparator 1. Therefore, the transistors 1a, 1c and 1f are rendered ON to render the transistors 1b, 1d and 1g OFF. The comparator 1 keeps applying the high level voltage produced across the transistor 1g to the pulse generator 3 in the same manner as in the case of opening of the switch 6b. The large reference voltage applied to the transistor 3c during the charging of the capacitor 3h is kept at $V_{OL}'$ smaller than $V_{OL}$, whereas the small reference voltage $V_{OS}$ applied during the discharging of the capacitor 3h is kept at $V_{OS}$. Since the charged voltage and the discharged voltage across the capacitor 3h are compared with respective voltages $V_{OL}'$ and $V_{OS}$ which have smaller difference than the voltages $V_{OL}$ and $V_{OS}$ have, the frequency and the duty cycle of the charging of the capacitor 3h are increased and decreased, respectively. As a result, the frequency and the duty cycle of the periodic pulses of the pulse generator 3 which energizes the relay 6 is increased and decreased, respectively. The increase in the flashing frequency may be observed by a vehicle operator through the interior lamp I.

Figure 5:
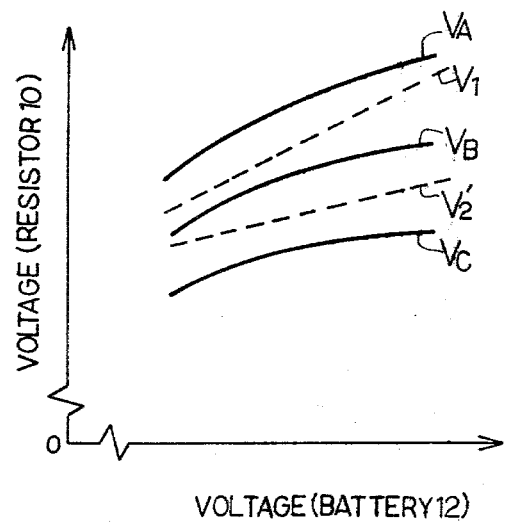
FIG. 5 is a characteristic chart illustrating relations between the voltages appeared across a battery and a current detecting resistor in the second embodiment.
Figure 4:
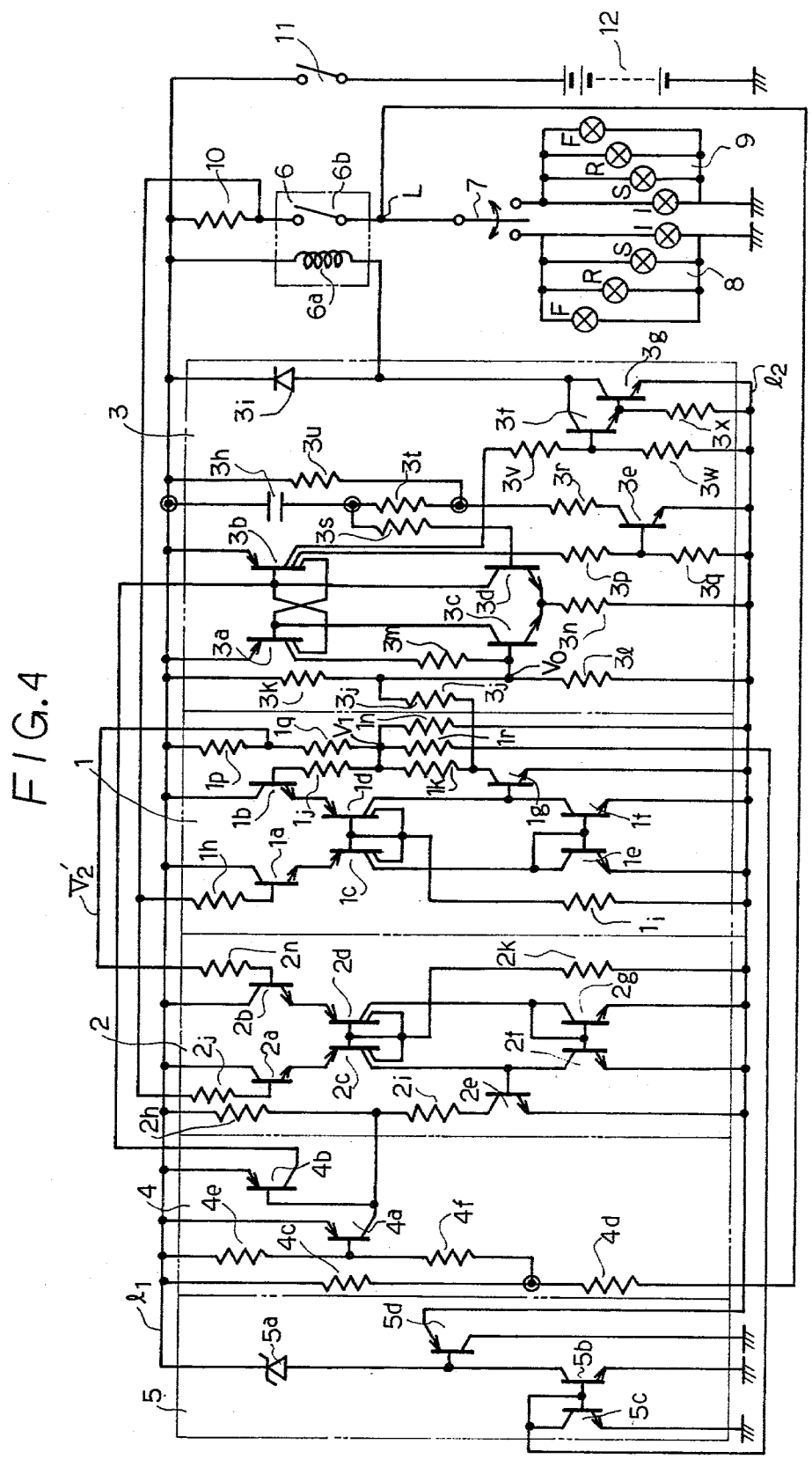
FIG. 4 is an electric wiring diagram illustrating a second embodiment.

The second embodiment shown in FIG. 4 is adapted to cause the relay 6 to function as an alarm buzzer in response to the presence of disconnection in both front and rear lamps F and R. It should be noticed in FIG. 4 that the second comparator 2 receives the second reference voltage $V_2'$ produced from the first comparator 1 in which resistors 1p, 1q and 1r are connected in series between the positive bus $1_1$ and the ground through the transistor 5c of the voltage regulator 5. As shown in FIG. 5, the second reference voltage $V_2'$ produced across the resistor 1p is determined to be smaller than the voltage $V_B$ and larger than a voltage $V_C$ appeared across the resistor 10 in response to the disconnections of the front and rear lamps F and R. Other circuit configuration of the second embodiment is the same as the configuration of the first embodiment. Therefore, the same reference numerals are used in FIG. 4 to represent the same configuration.

According to the second embodiment, when the disconnection is absent in both front and rear lamps F and R or the disconnection is present in either front or rear lamp F or R, quite some operation is performed as in the first embodiment. This is because that the second reference voltage $V_2'$ is smaller than the voltages $V_A$ and $V_B$ as the second reference voltage $V_2$ has been in the first embodiment.

Operation of the second embodiment differs from the first embodiment, when both front and rear lamps F and R are disconnected. When the turn-direction selecting switch 7 is closed to engage with either lamp group 8 or 9 in which both front and rear lamps F and R are disconnected, the voltage appeared at the terminal L becomes low to render the transistors 4a and 4b of the logic circuit 4 ON and OFF, respectively. As a result, the transistors 3b, 3d, 3e, 3f and 3g of the pulse generator 3 are rendered ON to energize the relay coil 6a which responsively closes the normally-open switch 6b. As soon as the electric current starts flowing from the battery 12 to the lamp group 8 or 9, the resistor 10 produces the voltage $V_C$ corresponding to the disconnections of the front and rear lamps F and R. Since the voltage $V_C$ applied to the comparator 2 is smaller than the second reference voltage $V_2'$, the transistors 2a, 2c and 2e of the comparator 2 are rendered ON to produce the low level voltage across the resistor 2i. In response to the closure of the switch 6b, the voltage appeared at the terminal L increases to render the transistor 4a of the logic circuit 4 OFF. As a result, the transistor 4b of the logic circuit 4 is rendered ON to render the transistors 3b, 3d, 3e, 3f and 3g of the pulse generator 3 OFF. The relay coil 6a is responsively deenergized to open the switch 6. Therefore, the electric current is prevented from flowing from the battery 12 to the lamp group 8 or 9 immediately after the closure of the switch 6b. The abovedescribed operation is repeated at a very high frequency during the closure of the selecting switch 7 so that the relay 6 in which the switch 6b opens and closes alternately functions as the alarm buzzer to inform the vehicle operator of the disconnections of the lamps F and R.

It should be noted in the first and second embodiments that even when the negative going noise signal are accidentally induced on the positive bus $1_1$ to decrease the voltage of the battery 12 to zero volt, the comparators 1 and 2, the pulse generator 3 and the logic circuit 4 is restored to the same operating conditions after the disappearance of the noise signals as before the appearance of the noise signals. Therefore, flashing operation of the lamp groups 8 or 9 is stopped for only a short while but restored immediately.

The present invention is not limited to the abovedescribed first and second embodiments but may be modified without departing from the spirit of the invention.

What is claimed is:

1. In a turn-direction indicating system of a vehicle in which two lamp groups, each having at least a front and a rear directional lamp connected in parallel with each other, are individually selectable by a turn-direction selecting switch, thereby producing a switch output signal, and coupled to a battery through a circuit comprising said selecting switch, a normally nonconductive switching means and a current detecting means, respectively coupled in series, an apparatus comprising:
   said current detecting means which is responsive to an electric current flowing from said battery to the lamp group selected by said selecting switch and effective to produce a detection output signal in proportion to said electric current;
   at least one reference means effective to produce a reference signal smaller than said detection output signal produced when at least one of said front and rear directional lamps in the lamp group selected by said selecting switch is connected;
   at least one comparison means responsive to said detection output signal and said reference signal and effective to produce a comparison output signal when said detection output signal is larger than said reference signal;
   logic means responsive to said comparison output signal and the switch output signal of said selecting switch and effective to produce a logic output signal indicative of closure of said selecting switch; and
   switching control means responsive to said logic output signal and to said detection output signal, and coupled to said normally nonconductive switching means in order to render said normally nonconductive switching means conductive periodically.

2. In a turn-direction indicating system of a vehicle in which two lamp groups, each having at least a front and a rear directional lamp connected in parallel with each other, are individually selectable by a turn-direction selecting switch, thereby producing a switch output signal, and coupled to a battery through a circuit comprising said selecting switch, a normally nonconductive switching means and a current detecting means, respectively coupled in series, an apparatus comprising:
   said current detecting means which is responsive to an electric current flowing from said battery to the lamp group selected by said selecting switch and effective to produce a detection output signal in proportion to said electric current; p1 at least one reference means effective to produce a reference signal smaller than said detection output signal produced when at least one of said front and rear directional lamps in the lamp group selected by said selecting switch is connected;
   at least one comparison means responsive to said detection output signal and said reference signal and effective to produce a comparison output signal when said detection output signal is larger than said reference signal;
   logic means responsive to said comparison output signal and the switch output signal of said selecting switch and effective to produce a logic output signal when said comparison output signal is absent and said switch output signal is indicative of both closure of said selecting switch and nonconduction of said normally nonconductive switching means, and when said comparison output signal is present and said switch output signal is indicative of both closure of said selecting switch and conduction of said normally nonconductive switching means; and
   switching control means responsive to said logic output signal and to said detection output signal, and coupled to said normally nonconductive switching means in order to render said normally nonconductive switching means conductive periodically.

3. In a turn-direction indicating system of a vehicle in which two lamp groups, each having at least a front and a rear directional lamp connected in parallel with each other, are individually selectable by a turn-direction selecting switch, thereby producing a switch output signal, and coupled to a battery through a circuit comprising said selecting switch, a normally nonconductive switching means comprising a normally open relay which is capable of being operated as an alarm buzzer for informing of the disconnection of both of said front and rear directional lamps in the lamp group selected by selecting switch, and a current detecting means, respectively coupled in series, an apparatus comprising:
   said current detecting means which is responsive to an electric current flowing from said battery to the lamp group selected by said selecting switch and effective to produce a detection output signal in proportion to said electric current;

at least one reference means effective to produce a reference signal smaller than said detection output signal produced when at least one of said front and rear directional lamps in the lamp group selected by such selecting switch is connected and larger than said detection output signal produced when both of said front and rear directional lamps in the lamp group selected by said selecting switch are disconnected;

at least one comparison means responsive to said detection output signal and said reference signal and effective to produce a comparison output signal when said detection output signal is larger than said reference signal;

logic means responsive to said comparison output signal and said switch output signal of said selecting switch and effective to produce a logic output signal, when said comparison output signal is absent and said switch output signal is indicative of both closure of said selecting switch and nonconduction of said normally nonconductive switching means, and when said comparison output signal is present and said switch output signal is indicative of both closure of said selecting switch and conduction of said normally nonconductive switching means, in order to enable a switching control means; and, when said comparison output signal is absent and said switch output signal is indicative of both closure of said selecting switch and nonconduction of said normally nonconductive switching means, and when said comparison output signal is absent and said switch output signal is indicative of both closure of said selecting switch and conduction of said normally nonconductive switching means, in order to enable and disable said switching control means at a rapid rate;

said switching control means which is responsive to said logic output signal and to said detection output signal, and coupled to said normally nonconductive switching means in order to render said normally nonconductive switching means conductive periodically when enabled by said logic means, and in order to render said normally conductive switching means periodically conductive at a rapid rate when enabled and disabled at a rapid rate by said logic means.

4. An apparatus according to claim 1, 2 or 3 wherein said switching control means comprises:

another reference means effective to produce an another reference signal respectively smaller and larger than said detection output signal produced when both of said front and rear directional lamps of the lamp group selected by said selecting switch are connected and when at least one of said front and rear directional lamps of the lamp group selected by said selecting switch is disconnected;

another comparison means responsive to said detection output signal and said another reference signal and effective to produce an another comparison output signal when said detection output signal is smaller than said another reference signal; and frequency control means responsive to said another comparision output signal and effective to alter the frequency of periodic conductions of said normally nonconductive switching means.

5. An apparatus according to claim 1, 2 or 3 wherein said reference means, said comparison means, and said switching control means are integrated upon semiconductor means; and wherein said logic means comprises a part thereof which is integrated upon semiconductor means and another part thereof which comprises a resistor which is not integrated upon semiconductor means, said another part coupled between said part and said turn-direction selecting switch in order to apply said switch output signal to said part therethrough.

* * * * *